(12) United States Patent
Negri et al.

(10) Patent No.: US 11,167,479 B2
(45) Date of Patent: Nov. 9, 2021

(54) THREE-DIMENSIONAL PRINTED PART

(71) Applicant: HEWLETT-PACKARD DEVELOPMENT COMPANY, L.P., Spring, TX (US)

(72) Inventors: Graciela Negri, San Diego, CA (US); Alexey S. Kabalnov, San Diego, CA (US); Jake Wright, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/491,215

(22) PCT Filed: Jan. 26, 2018

(86) PCT No.: PCT/US2018/015471
§ 371 (c)(1),
(2) Date: Sep. 5, 2019

(87) PCT Pub. No.: WO2019/147263
PCT Pub. Date: Aug. 1, 2019

(65) Prior Publication Data
US 2020/0346402 A1    Nov. 5, 2020

(51) Int. Cl.
*B29C 64/165* (2017.01)
*B33Y 10/00* (2015.01)
*B33Y 80/00* (2015.01)
*B33Y 70/00* (2020.01)

(52) U.S. Cl.
CPC ............ *B29C 64/165* (2017.08); *B33Y 10/00* (2014.12); *B33Y 70/00* (2014.12); *B33Y 80/00* (2014.12)

(58) Field of Classification Search
CPC .......... B29C 64/165; B29C 64/00–393; B33Y 10/00; B33Y 70/00; B33Y 80/00
See application file for complete search history.

(56) References Cited

U.S. PATENT DOCUMENTS

| | | |
|---|---|---|
| 2005/0239917 A1 | 10/2005 | Nelson et al. |
| 2015/0258733 A1 | 9/2015 | Okamoto et al. |
| 2015/0352785 A1 | 12/2015 | Folgar et al. |
| 2017/0094760 A1 | 3/2017 | Larkin et al. |
| 2017/0104198 A1 | 4/2017 | Duoss et al. |
| 2018/0371249 A1* | 12/2018 | Bihari ...................... C08K 5/13 |
| 2021/0130604 A1* | 5/2021 | Ramakrishnan ....... B33Y 70/00 |

FOREIGN PATENT DOCUMENTS

| | | |
|---|---|---|
| WO | WO2007114895 A2 | 10/2007 |
| WO | WO2012164015 A1 | 12/2012 |
| WO | WO2016013198 A1 | 1/2016 |
| WO | WO2016097932 A1 | 6/2016 |
| WO | WO 2017/074397 | * 5/2017 |

\* cited by examiner

*Primary Examiner* — Mary Lynn F Theisen
(74) *Attorney, Agent, or Firm* — HPI Patent Department

(57) ABSTRACT

According to examples, a three-dimensional printed part including a core including a build material; an inner shell including the build material and an antistatic agent, wherein the antistatic agent includes a water soluble compound; and an external shell including the build material is disclosed.

15 Claims, 6 Drawing Sheets

THREE-DIMENSIONAL PRINTED PART

BACKGROUND

In three-dimensional (3D) printing, an additive printing process is often used to make three-dimensional solid parts from a digital model. 3D printing is often used in rapid product prototyping, mold generation, mold master generation, and short-run manufacturing. Some 3D printing techniques are considered additive processes because they involve the application of successive layers of particulate material to an existing surface (template or previous layer). Additive processes often include solidification of the particulate material, which for some materials may be accomplished through use of heat and/or chemical binders.

BRIEF DESCRIPTION OF THE DRAWING

Features of the present disclosure are illustrated by way of example and not limited in the following figure(s), in which like numerals indicate like elements, in which.

DETAILED DESCRIPTION

For simplicity and illustrative purposes, the present disclosure is described by an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer to form a 3D printed part, and a composition and an agent for use in the method. A 3D part may be printed, formed, or otherwise generated onto a build area platform. The 3D printer may also include a spreader to spread a layer of a build material onto the build area platform, and a printhead to selectively deposit the agent. The 3D printer may form successive layers of the build material, which may be spread and may receive the agent. As used herein "3D printed part," "3D part," "3D object," "object," or "part" may be a completed 3D printed part or a layer of a 3D printed part.

Figure 1:
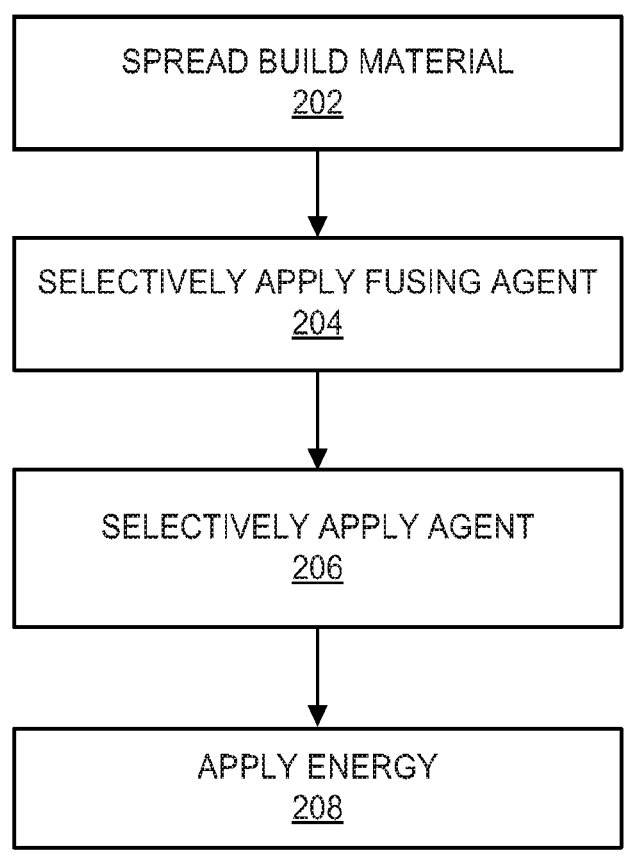
FIGS. 1 and 2 each respectively show a flow diagram of an example method of fabricating a 3D part.
Figure 3:
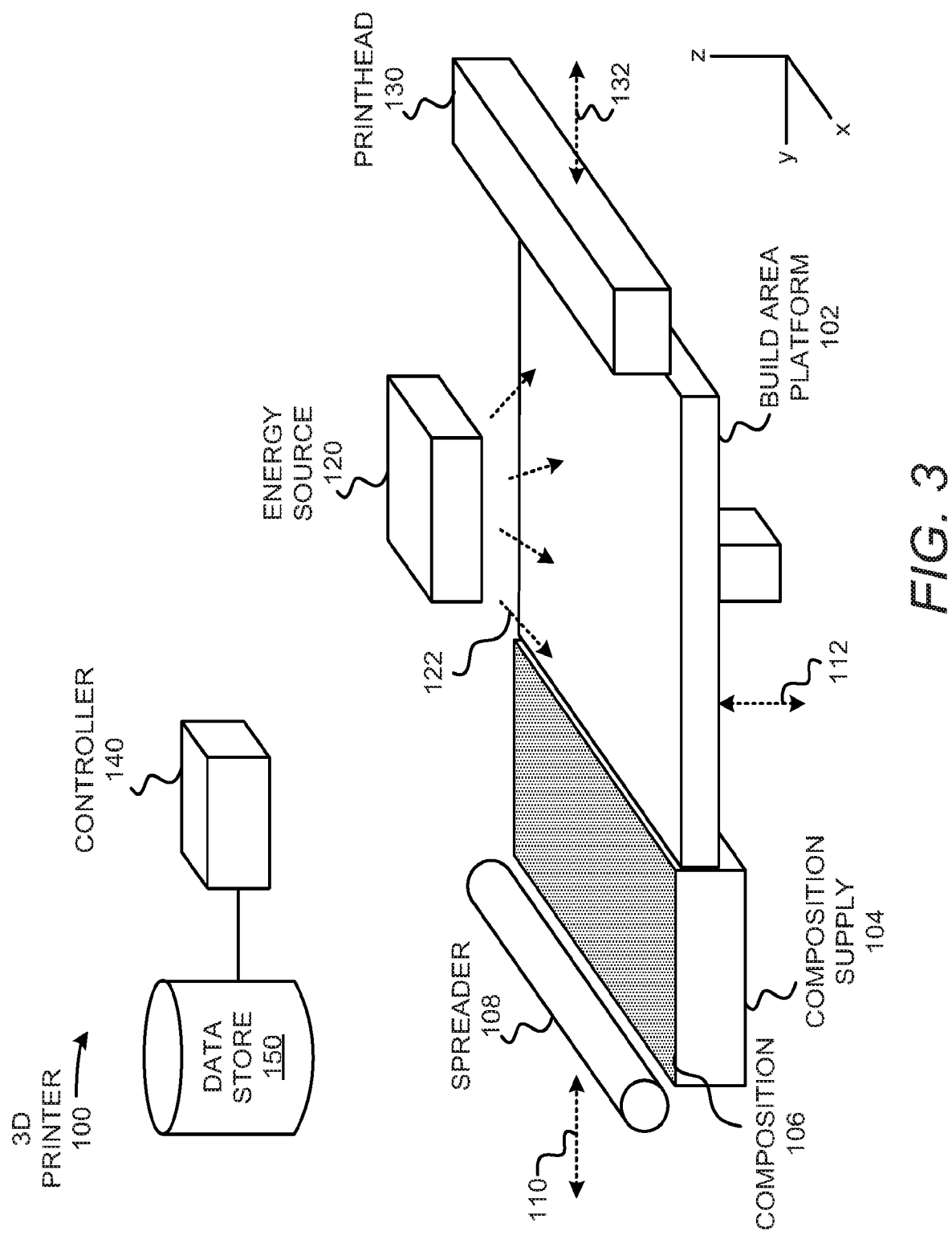
FIG. 3 shows a simplified isometric view of an example three-dimensional (3D) printer for generating, building, or printing three-dimensional parts.
Figure 4:
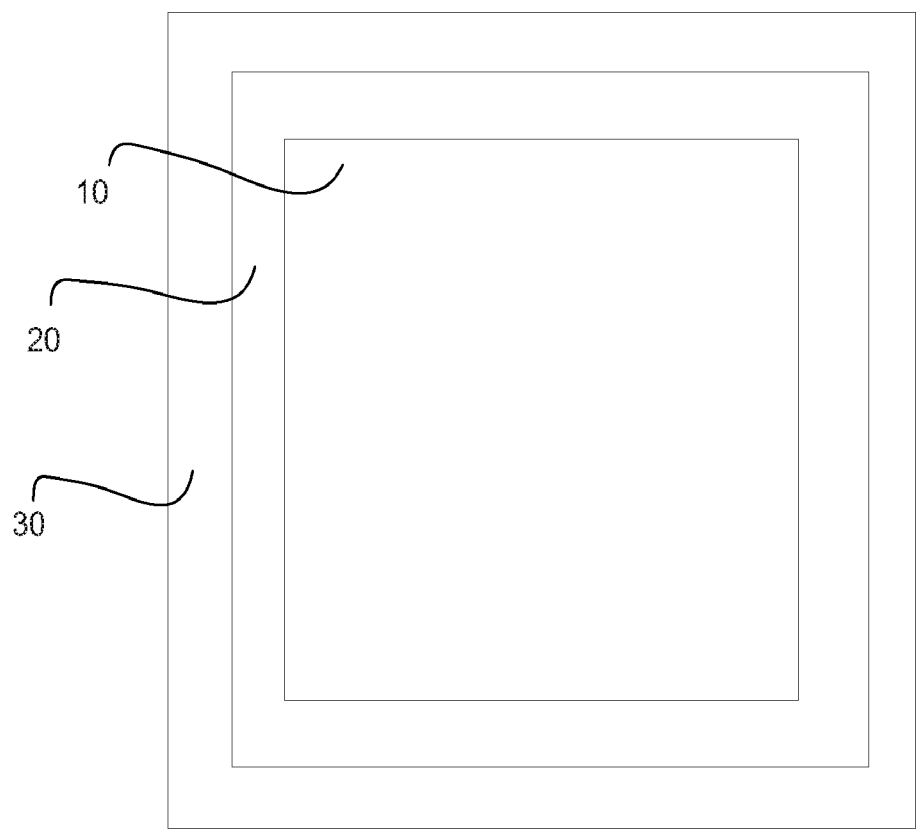
FIG. 4 shows an example three-dimensional printed part.

With reference first to FIG. 3, there is shown a simplified isometric view of an example 3D printer 100 for generating, building, or printing three-dimensional parts. It should be understood that the 3D printer 100 depicted in FIG. 3 may include additional components and that some of the components described herein may be removed and/or modified without departing from a scope of the 3D printer 100 disclosed herein. It should also be understood that the components of the 3D printer 100 depicted in FIG. 3 may not be drawn to scale and thus, the 3D printer 100 may have a different size and/or configuration other than as shown therein. The 3D printer 100 may be used to form a 3D printed part 40, as shown in FIG. 4, including a core 10 including a build material; an inner shell 20 including the build material and an antistatic agent, in which the antistatic agent may can include a water soluble compound; and an external shell 30 including the build material. In an example, the 3D printer 100 may be used to form a 3D printed part 40 including a core 10 including a fusing agent; an inner shell 20 including a fusing agent, and an antistatic agent; and an external shell 30 including an antistatic agent; in which the antistatic agent is present in a composition in an amount from about 0.01 wt. % to about 20 wt. % of based upon the total weight percent of the composition. A method of making the three-dimensional printed part may include spreading a layer of build material; selectively applying a fusing agent on the build material; and selectively applying an antistatic agent, wherein the antistatic agent includes a water soluble compound, as shown in FIG. 1.

The 3D printer 100 is depicted as including a build area platform 102, a build material supply 104 containing build material 106, and a spreader 108. The build area platform 102 may be integrated with the 3D printer 100 or may be a component that is separately insertable into the 3D printer 100, e.g., the build area platform 102 may be a module that is available separately from the 3D printer 100. The build material supply 104 may be a container or surface that is to position the build material 106 between the spreader 108 and the build area platform 102. The build material supply 104 may be a hopper or a surface upon which the build material 106 may be supplied. The spreader 108 may be moved in a direction as denoted by the arrow 110, e.g., along the y-axis, over the build material supply 104 and across the build area platform 102 to spread a layer of the build material 106 over a surface of the build area platform 102.

The build material 106 may be a powder, a short fiber, a liquid, a paste, or a gel. In an aspect, the powder may be formed from, or may include short fibers, that may, for example, have been cut into short lengths from long strands, or threads of build material. The build material may be a polymeric material, metal material, or may be a composite material of polymer and ceramic. Non-limiting examples of build material include semi-crystalline thermoplastic materials with a wide processing window of greater than 5° C. (i.e., the temperature range between the melting point and the re-crystallization temperature. Some specific examples of the polymeric build material 12 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the build material include polyethylene, polyether, polyethylene terephthalate (PET), and an amorphous variation of these materials. Still other examples of suitable build material include polystyrene, polyacetals, polypropylene, polycarbonate, polyester, thermoplastic polyurethanes, other engineering plastics, and blends of any two or more of the polymers listed herein. In an aspect, the build material may be selected from the group consisting of polyethylenes, polyethylene terephthalates, polystyrenes, polyacetals, polypropylenes, polycarbonates, polyesters, thermoplastic polyurethanes, and combinations thereof.

Any of the previously listed build materials may be combined with ceramic particles to form the composite build material. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), $Na_2O/CaO/SiO_2$ glass (soda-lime glass), silicon carbide (SiC), silicon nitride ($Si_3N_4$), yttrium oxide-stabilized zirconia (YTZ), or combinations thereof. The amount of ceramic particles that may be combined with the build material may depend on the build material used, the ceramic particles used, and the 3D part 40 to be formed.

The build material may have a melting point ranging from about 50° C. to about 400° C. As an example, the build material may be a polyamide having a melting point of 180° C., or thermoplastic polyurethanes having a melting point ranging from about 100° C. to about 165° C.

The build material may also include a binder, such as a polymer binder, a metal nanoparticle binder, or combinations thereof. The polymer binder may be a semi-crystalline polymer, such as polypropylene and polyethylene. The polymer binder may be a non-crystalline polymer, such as polyethylene oxide, polyethylene glycol (solid), acrylonitrile butadiene styrene, polystyrene, styrene-acrylonitrile resin, and polyphenyl ether. The polymer binder may be one of polypropylene, polyethylene, poly(methyl methacrylate), low density polyethylene, high density polyethylene, polyethylene oxide, polyethylene glycol, acrylonitrile butadiene styrene, polystyrene, styrene-acrylonitrile resin, polyphenyl ether, polyamide 11, polyamide 12, polymethyl pentene, polyoxymethylene, polyethylene terephthalate, polybutylene terephthalate, polyvinylidene fluoride, polytetrafluoroethylene, perfluoroalkoxy alkane, polyphenylene sulfide, polyurethanes, polyvinyl alcohol, polylactic acid, or polyether ether ketone.

The polymer binder may have a melting point temperature less than about 250° C., for example the melting point temperature may range from about 50° C. to about 249° C., for example from about 60° C. to about 240° C., and as a further example from about 70° C. to about 235° C.

It is to be understood that the build material may also include a charging agent, a flow aid, or combinations thereof. A charging agent may be added to suppress tribocharging. Examples of suitable charging agent(s) include, but are not limited to, aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include a natural based ethoxylated alkylamine, a fatty acid ester, and an alkane sulfonate. In an example, the charging agent may be added in an amount ranging from greater than about 0 wt. % to less than about 5 wt. % based upon the total wt. % of the build material.

A flow aid may be added to improve the flowability of the build material by reducing the friction, the lateral drag, and the tribocharge buildup (by increasing the particle conductivity). Non-limiting examples of suitable flow aids include tricalcium phosphate, powdered cellulose, magnesium stearate, sodium bicarbonate, sodium ferrocyanide, potassium ferrocyanide, calcium ferrocyanide, bone phosphate, sodium silicate, silicon dioxide, calcium silicate, magnesium silicate, talcum powder, sodium aluminosilicate, potassium aluminum silicate, calcium aluminosilicate, bentonite, aluminum silicate, stearic acid, and polydimethylsiloxane. In an example, the flow aid may be added in an amount ranging from greater than about 0 wt. % to less than about 5 wt. % based upon the total wt. % of the build material.

The 3D printer 100 is further depicted as including a printhead 130 that may be scanned across the build area platform 102 in the direction indicated by the arrow 132, e.g., along the y-axis. The printhead 130 may be, for instance, a thermal inkjet printhead, a piezoelectric printhead, etc., and may extend a width of the build area platform 102. Although a single printhead 130 has been depicted in FIG. 3, it should be understood that multiple printheads may be used that span the width of the build area platform 102. Additionally, the printheads 130 may be positioned in multiple printbars. The printhead 130 may also deposit an agent, such as a fusing agent, a detailing agent, and/or an antistatic agent, over a selected area of a layer of the build material 106. In an aspect, multiple printheads 130 may independently deposit the same or different agent over a selected area of a layer of the build material 106. In an aspect, the multiple printheads 130 may simultaneously or sequentially deposit the same or different agents over a selected area of a layer of the build material 106.

In one example, a first printhead may selectively apply an antistatic agent over a first select area of a layer of the build material 106 to form an external shell 30. The first select area of a layer of the build material may form an external shell 30 of a 3D printed part 40. The external shell may include an antistatic agent that is the same or different from the antistatic agent of the inner shell. In an aspect, the external shell 30 may have a thickness ranging from about 0 mm to about 5 mm, for example, from about 0.2 mm to about 1.5 mm, and as a further example, from about 0.5 mm to about 1 mm.

In another example, a second printhead may deposit a fusing agent over a second select area of a layer of the build material 106 to form an inner shell 20. The first printhead may simultaneously or sequentially deposit an antistatic agent to the second select area to form the inner shell 20. In an aspect, the fusing agent and the antistatic agent may be selectively applied over the build material to form an inner shell. The antistatic agent used to form the inner shed 20 may be the same or different from the antistatic agent used to form the external shell 30. In an aspect, the internal shell 20 may have a thickness ranging from about 0.1 mm to about 5 mm, for example, from about 0.5 mm to about 3 mm, and as a further example, from about 1 mm to about 2 mm.

In a further example, the second printhead may selectively apply a fusing agent over a third select area of a layer of the build material to form a core 10. The fusing agent used to form the inner shell 20 may be the same or different from the fusing agent used to form the core 10. In an aspect, the core 10 may make up the entirety of the area not already made up of the internal shell 20.

The agent, such as a fusing agent, detailing agent, or antistatic agent, may be a composition including various components that may be selectively applied to the layer of the build material 106. Non-limiting examples of components of the agent include an aqueous vehicle, a non-aqueous vehicle, chemical binders, a colorant, a solvent, a co-solvent, a surfactant, a dispersant, a biocide, an anti-kogation agent, viscosity modifiers, buffers, stabilizers, and combinations thereof. The presence of a co-solvent, a surfactant, and/or a dispersant in the agent may assist in obtaining a particular wetting behavior with the build material 106. A fusing agent may include similar or different components than the detailing agent. Additionally, an antistatic agent used to form an inner shell 20 may be the same or different from an antistatic agent used to form an external shell 30. Further, a fusing agent used to form a core 10 may be the same or different from the fusing agent used to form an inner shell 20. In an aspect, more than one agent, such as a fusing agent, a detailing agent, and/or an antistatic agent, may be used during the 3D printing process.

The agent may be a fusing agent. The fusing agent may be applied over the build material. Upon application of energy, such as electromagnetic radiation, the fusing agent may fuse with the build material to form a layer.

The agent may be a detailing agent. The detailing agent may provide a cooling effect. The detailing agent may be selectively applied to areas to achieve uniform temperatures. Additionally, the detailing agent may be selectively applied to areas in an effort to simplify cleaning and post-processing. In an aspect, the detailing agent may be used in combination with the antistatic agent. For example, the detailing agent and the antistatic agent may be applied simultaneously to the same selected area from different printheads or the detailing agent and the antistatic agent may be present in a single composition and applied to the same selected area from the same printhead.

The agent may be an antistatic agent. The antistatic agent may be compatible with polymers, such as the build material 106. The antistatic agent may be able to a dissipate static charge that may accumulate on a 3D printed part 40. The antistatic agent may be thermally stable at a polymer melt processing temperature. For example, the antistatic agent may be thermally stable at temperatures for formation of the 3D printed part 40, for example, from about 50° C. to about 400° C. The antistatic agent may be liquid at room temperature, for example, about 25° C. In an aspect, the antistatic agent does not absorb, or minimally absorbs, light in a near infrared wavelength (120 THz-400 THz/2500 nm-750 nm). For example, 20% or less radiation may be absorbed in the near infrared wavelength by the antistatic agent. Additionally, the antistatic agent may be transparent in the near infrared wavelength, for example, 80% or greater radiation may be transmitted by the antistatic agent in a near infrared wavelength.

The antistatic agent may be a composition that may include various components that may impart antistatic or charge dissipating properties. In an aspect, the antistatic agent may include a water soluble compound. The antistatic agent may be formed of conductive materials that are electrically conductive, thermally conductive, or both.

The antistatic agent may include a salt of an alkali or alkaline earth metal. The salt of the alkali or alkaline earth metal may include quaternary amines, chlorates, phosphates, carbonates, borates, phosphonates, sulfates, acetates, citrates, and perchlorates. Non-limiting examples of carbonates include sodium carbonates, potassium carbonates, lithium carbonates, barium carbonates, magnesium carbonates, calcium carbonates, ammonium carbonates, cobaltous carbonates, ferrous carbonates, lead carbonates, manganese carbonates, and nickel carbonates. Non-limiting examples of perchlorates include sodium perchlorate, potassium perchlorate, lithium perchlorate, barium perchlorate, magnesium perchlorate, calcium perchlorate, ammonium perchlorate, cobaltous perchlorate, ferrous perchlorate, lead perchlorate, manganese perchlorate, and nickel perchlorate. Non-limiting examples of chlorates include sodium chlorates, potassium chlorates, lithium chlorates, barium chlorates, magnesium chlorates, calcium chlorates, ammonium chlorates, cobaltous chlorates, ferrous chlorates, lead chlorates, manganese chlorates, and nickel chlorates. Non-limiting examples of phosphates include sodium phosphates, potassium phosphates, lithium phosphates, barium phosphates, magnesium phosphates, calcium phosphates, ammonium phosphates, cobaltous phosphates, ferrous phosphates, lead phosphates, manganese phosphates, and nickel phosphates. The antistatic agent may also be a sulfonimide or a sulfonamide.

In an aspect, the antistatic agent may include a salt of lithium. Non-limiting examples of a salt of lithium include $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al-V_2O_5$, lithium bis(oxalato)borate, $LiN(SO_2CF_3)_2$, $LiN(SOCF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof.

The antistatic agent may be present in a composition in an amount ranging from about 0.01 wt. % to about 20 wt. % based upon the total weight percent of the composition. In an aspect, the antistatic agent may be present in a composition in an amount ranging from about 0.1 wt. % to about 15 wt. %, for example, from about 2 wt. % to about 13 wt. %, for example, about 4 wt. % based upon the total weight percent of the composition.

The agent may further include other suitable binders, for example, chemical binders, such as metal salts, sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), or a short chain polyacrylic acid.

Other suitable binders that may be used include water-dispersible or water soluble polymers. Examples of polymer classes include acrylics, styrenics, polyethylenes, polypropylenes, polyesters, polyamides, polyurethanes, polyureas, polyethers, polycarbonates, polyacid anhydrides, and copolymers and/or combinations thereof. Such polymer particles may be iono-meric, film-forming, non-film-forming, fusible, or heavily crosslinked, and may have a wide range of molecular weights and glass transition temperatures.

The colorant may be, for example, a pigment and/or dye. The colorant may have any color (e.g., cyan, magenta, yellow, white, etc.). Some examples of a colorant include a set of cyan, magenta, and yellow, such as C1893A (cyan), C1984A (magenta), and C1985A (yellow); or C4801A (cyan), C4802A (magenta), and C4803A (yellow); all of which are available from Hewlett-Packard Company. Other commercially available colorants include C9384A (printhead HP 72), C9383A (printhead HP 72), C4901A (printhead HP 940), and C4900A (printhead HP 940).

Some examples of a white colorant include pigments, such as titanium dioxide ($TiO_2$), zinc oxide ($ZnO$), calcium carbonate ($CaCO_3$), barium sulfate ($BaSO_4$), or combinations thereof. The colorant may, in some instances, be dispersed with a dispersing additive. As such, the dispersing additive helps to uniformly distribute the colorant throughout the agent. The dispersing additive may be present in the agent in an amount ranging from about 0.01 wt. % to about 0.8 wt. % based on the total wt. % of the colorant. Some examples of the dispersing additive include a water soluble acrylic acid polymer, a high molecular weight block copolymer with pigment affinic groups, and combinations thereof.

Surfactant(s) may be used to improve the wetting properties and the jettability of the agent. Examples of suitable surfactants may include a self-emulsifiable, nonionic wetting agent based on acetylenic diol chemistry, a nonionic fluorosurfactant, and combinations thereof. In other examples, the surfactant may be an ethoxylated low-foam wetting agent or an ethoxylated wetting agent and molecular defoamer. Still other suitable surfactants include non-ionic wetting agents and molecular defoamers or water-soluble, non-ionic surfactants. In some examples, it may be desirable to utilize a surfactant having a hydrophilic-lipophilic balance (HLB) less than 10. Whether a single surfactant is used or a combination of surfactants is used, the total amount of surfactant(s) in the agent may range from about 0.1 wt % to about 3 wt % based on the total wt % of the agent.

Some examples of a co-solvent include 1-(2-hydroxyethyl)-2-pyrollidinone, 2-Pyrrolidinone, 1,5-Pentanediol, Triethylene glycol, Tetraethylene glycol, 2-methyl-1,3-propanediol, dipropylene glycol methyl ether, tripropylene glycol butyl ether, dipropylene glycol butyl ether, triethylene glycol butyl ether, 1,6-Hexanediol, Tripropylene glycol methyl ether, N-methylpyrrolidone, Ethoxylated Glycerol-1 (LEG-1), 1,2-hexanediol, and combinations thereof. The co-solvent may be present in an amount ranging from about 10 wt. % to about 30 wt. % based on the total wt. % of the agent.

Examples of suitable biocides include an aqueous solution of 1,2-benzisothiazolin-3-one, quaternary ammonium compounds, and an aqueous solution of methylisothiazolone. Whether a single biocide is used or a combination of biocides is used, the total amount of biocide(s) in the fusing agent may range from about 0.1 wt % to about 1 wt % with respect to the total wt % of the fusing agent.

Non-limiting examples of suitable anti-kogation agents include oleth-3-phosphate or polyoxyethylene (3) oleyl mono/di-phosphate, a metal chelator/chelating agent, such as methylglycinediacetic acid, and combinations thereof.

An exemplary agent, such as a fusing agent, may include from about 1 wt. % to about 10 wt. % of colorant, from about 10 wt. % to about 30 wt. % of co-solvent(s), from about 0.5 wt. % to about 2 wt. % of dispersant(s), from 0.01 wt. % to about 1 wt. % of anti-kogation agent(s), from about 0.1 wt. % to about 5 wt. % of binder(s), from about 0.05 wt. % to about 0.1 wt. % biocide(s), and a balance of water. Another example may include from about 1 wt. % to about 7 wt. % of colorant, from about 10 wt % to about 30 wt. % of co-solvent(s), from about 0.25 wt. % to about 2 wt. % of dispersant(s), from 0.05 wt. % to about 0.1 wt. % of chelating agent(s), from about 0.005 wt. % to about 0.2 wt. % of buffer(s), from about 0.05 wt. % to about 0.1 wt. % biocide(s), and a balance of water.

A method of making an antistatic agent may include combining various components to form the antistatic agent. In particular, the method may include combining a co-solvent in an amount from about 10 wt. % to about 30 wt. %, a wetting additive, a surfactant in an amount from about 0.1 wt % to about 3 wt %, a biocide in an amount from about 0.05 wt. % to about 0.1 wt. %, a salt of an alkali or alkaline earth metal in an amount from about 0.01 wt. % to about 20 wt. %, and a balance of water.

Following selective deposition of the agent onto selected areas of the layer of the build material 106, the build area platform 102 may be lowered as denoted by the arrow 112, e.g., along the z-axis. In addition, the spreader 108 may be moved across the build area platform 102 to form a new layer of build material 106 on top of the previously formed layer. In an aspect, the spreader 108 may spread a layer of build material 106. Moreover, the printhead 130 may deposit the agent onto predetermined areas of the new layer of build material 106. For example, the printhead 130 may deposit an antistatic agent over a first select area for form an external shell 30 of the 3D printed part 40. A second printhead may deposit a fusing agent over a second select area of a layer of the build material 106 to form an inner shell 20. The first printhead may simultaneously or sequentially deposit an antistatic agent to the second select area to form the inner shell 20. In a further example, the second printhead may deposit a fusing agent over a third select area of a layer of the build material 106 to form a core 10. The above-described process may be repeated until a predetermined number of layers have been formed to fabricate a desired 3D part.

As also shown in FIG. 3, the 3D printer 100 may include a controller 140 that may control operations of the build area platform 102, the build material supply 104, the spreader 108, the energy source 120, and the printhead 130. The controller 140 is also depicted as being in communication with a data store 150. The data store 150 may include data pertaining to a 3D part to be printed by the 3D printer 100.

A 3D printed part may be created from areas of the build material 106 that have received the agent from the printhead 130. Upon application of energy 122, such as by heat lamps, ultraviolet lights, and the like, the selectively deposited agent may absorb the energy.

The applied energy 122 may be removed and 3D printed part may cool by removal of the energy. Upon cooling, the formed 3D printed part may solidify. The 3D printed part may include the external shell, the internal shell, and the core, in which the core is at least partially encompassed by the inner shell. In an aspect, the core is at least about 50% encompassed by the inner shell, for example, at least about 75%, and as a further example, at least about 90% encompassed by the inner shell. In an aspect, the core is completely encompassed by the shell. In an aspect, the inner shell is at least about 50% encompassed by the external shell, for example, at least about 75%, and as a further example, at least about 90% encompassed by the external shell. In an aspect, the inner shell is completely encompassed by the external shell. The formed green body may be removed from the build platform.

Various manners in which an example 3D part may be fabricated are discussed in greater detail with respect to the example methods 200 and 300 respectively depicted in FIGS. 3 and 4. It should be apparent to those of ordinary skill in the art that the methods 200 and 300 may represent generalized illustrations and that other operations may be added or existing operations may be removed, modified, or rearranged without departing from the scopes of the methods 200 and 300.

The descriptions of the methods 200 and 300 are made with reference to the 3D printer 100 illustrated in FIG. 3 for purposes of illustration. It should, however, be clearly understood that 3D printers and other types of apparatuses having other configurations may be implemented to perform either or both of the methods 200 and 300 without departing from the scopes of the methods 200 and 300.

Prior to execution of the method 200 or as part of the method 200, the 3D printer 100 may access data pertaining to a 3D part that is to be printed. By way of example, the controller 140 may access data stored in the data store 150 pertaining to a 3D part that is to be printed. The controller 140 may determine the number of layers of build material 106 that are to be formed and the locations at which an agent from the printhead 130 is to be selectively deposited on areas, to impart improved strength, of each of the respective layers of build material 106.

With reference first to FIG. 1, at block 202, a build material 106 may be spread over a build area platform 102. In addition, at block 204, a fusing agent may be selectively deposited on the spread layer of the build material 106. At block 206, an agent may be selectively deposited on the spread layer of the build material 106. In addition, in some examples, a plurality of agents, such as a detailing agent, an antistatic agent, or both, may be selectively deposited onto the build material 106. In these examples, one of the agents may be applied to the areas that are to form an inner shell and another one of the agents may be applied to the areas that are to form the external shell. In an example, the antistatic agent may be applied over a first select area for form an external shell 30 of the 3D printed part 40. The fusing agent may be applied, simultaneously or sequentially with an antistatic agent, over a second select area of a layer of the build material 106 to form the inner shell 20. The fusing agent may be applied over a third select area of a layer of the build material 106 to form a core 10.

At block 208, energy 122 may be applied onto the spread layer of build material 106, the selectively deposited fusing agent, and the selectively deposited agent, such as a detailing agent and/or antistatic agent. Block 208 may represent a plurality of operations in which multiple layers of build material 106 are spread, selectively deposited with an agent, such as a fusing agent, a detailing agent, and/or an antistatic agent, and supplied with energy to form the 3D printed part, in which parts of the 3D printed part are formed in each of the successively formed layers.

Figure 2:
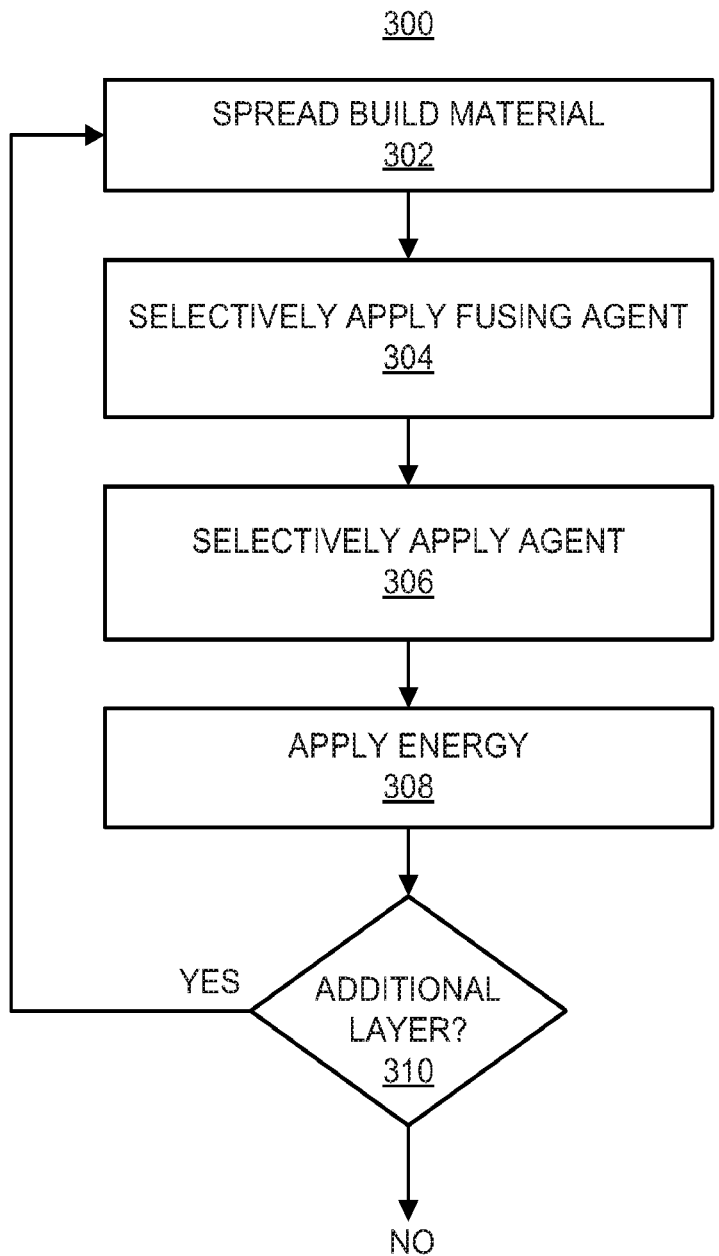

Turning now to FIG. 2, at block 302, the build material may be spread, at block 304, a fusing agent may be selectively deposited onto the spread build material 106; and at block 306, an agent, such as a detailing agent, and/or an antistatic agent may be selectively deposited onto the spread build material 106. Blocks 302, 304, and 306 may be similar to blocks 202, 204, and 206 discussed above with respect to FIG. 1. In addition, at block 308, energy 122 may be applied in manners similar to those discussed above with respect to block 208. At block 310, a determination may be made, for instance, by a processor of the 3D printer 100, as to whether an additional layer should be formed. In response to a determination that another layer is to be formed, blocks 302-308 may be repeated on top of a previously deposited layer.

However, in response to a determination that an additional layer is not to be formed, the formed layers, e.g., 3D printed part, may be cooled and removed from the 3D printer 100. Removal of the 3D printed part may cause it to cool to room temperature and solidify.

EXAMPLES

An antistatic agent was prepared using the following formulation:

| | Wt. % |
|---|---|
| 2-Pyrrolidinone | 19 |
| Triethylene glycol | 8 |
| Wetting additive | 0.75 |
| Anionic surfactant | 0.45 |
| aqueous solution of the trisodium salt of methylglycinediacetic acid | 0.08 |

-continued

| | Wt. % |
|---|---|
| Microbiocide B20 | 0.18 |
| Microbiocide M20 | 0.14 |
| lithium bis-trifluoromethanesulfonimide | 4.0 |
| Water | Balance |

The agent was used in a three-dimensional printer using various materials: polyamide 12, multipurpose polyamide 12, and polyether block amide. A fusing agent was printed throughout the entire volume of the core and the inner shell. The agent in the formulation above was printed 250 microns from the border of the part and 250 microns out from the border of the part. In geological terms, the agent was printed in the inner shell and the external shell. No other agents were used to create the three-dimensional printed part. FIG. 2 shows a cross-section of the printed geometry, where the external shell 30 was printed with the agent in the formulation above, the inner shell 20 was printed with the agent in the formulation above and with a fusing agent, and the core 10 was printed with the fusing agent.

The resistivity of the printed part was measured with an ohmmeter (V=100 volts, DC). Each three-dimensional printed part was squeezed between two conductive electrodes and conductive rubber pads. Each part was measured three times, in different locations, and the values averaged.

Figure 5:
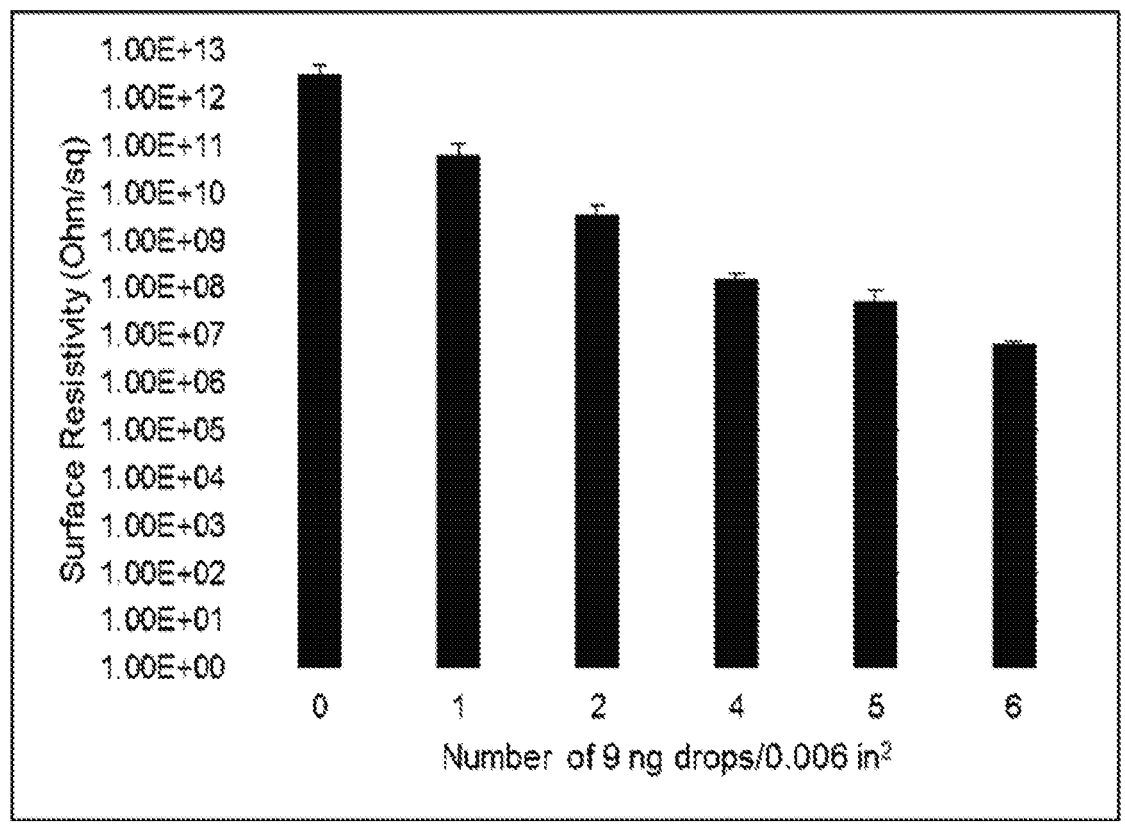
FIG. 5 is a bar graph showing surface resistivity per amount of antistatic agent.

Six rectangular bars (40×15×2 mm) were made from polyamide 12 using the printing mode described above. The amount of the agent applied was varied from 0 to 6 drops of 9 ng of agent/0.006 int. The surface resistivity was measured and a flux-dependent decrease in resistivity was seen as the amount of the agent was increased, as shown in FIG. 5.

Figure 6:
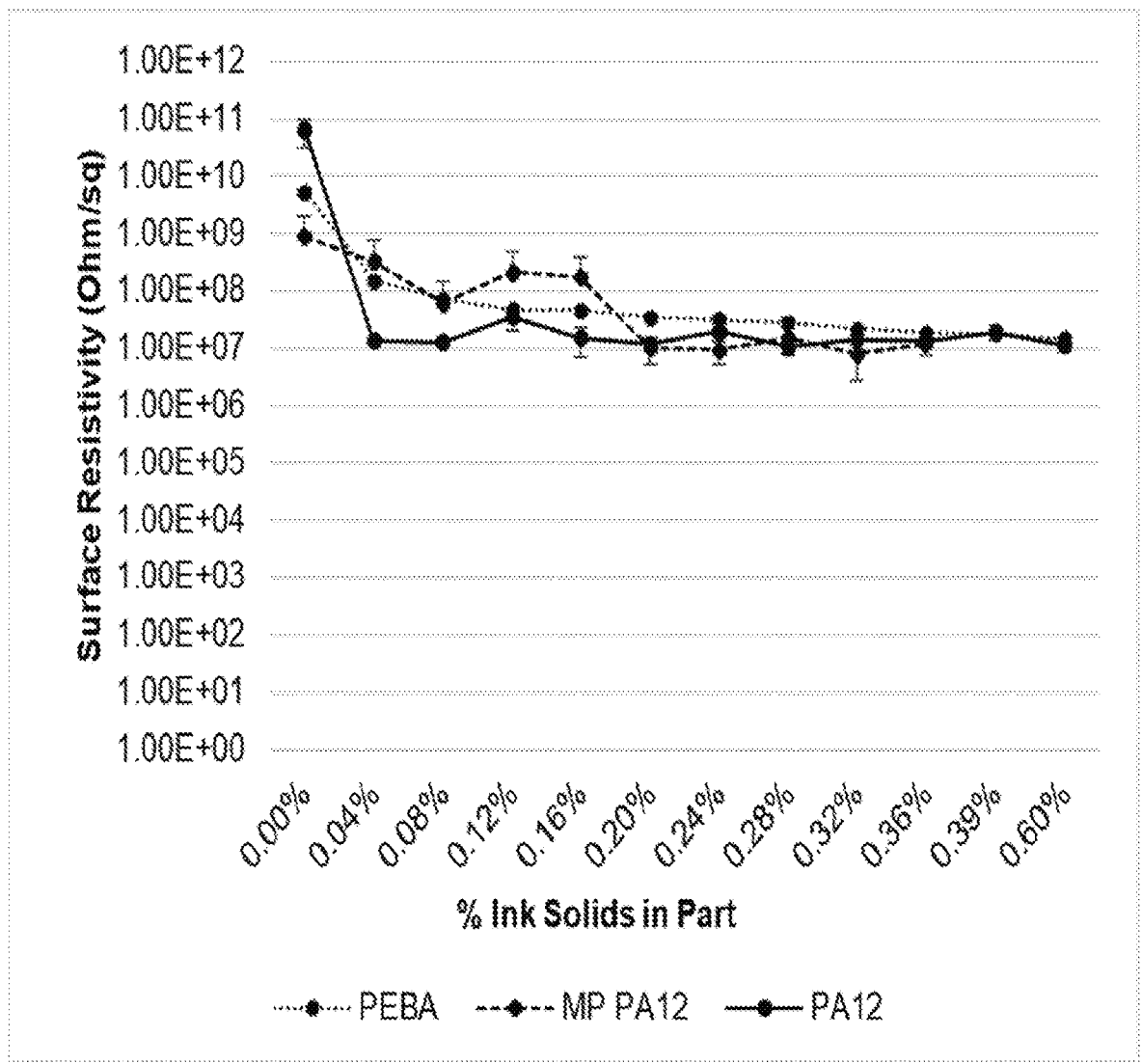
FIG. 6 is line graph showing surface resistivity per percent solids.

Three sets of cubes (10 mm$^3$) were printed with different build material, i.e., polyether block amide, multipurpose polyamide 12, and polyamide 12. Within each set increasing amounts of the agent of the formulation described above were used (ranging from 0.00% to 0.60% solids). As can be seen from the data in FIG. 6, the increasing amounts of agent present in the three-dimensional part decreased the surface resistivity of the three-dimensional part.

A decrease in surface resistivity indicates that the presence of the antistatic agent in the inner shell of the three-dimensional printed part is dissipating static charge. The three-dimensional printed part is less likely to build-up static charge on its surface and is less likely to have an electrostatic discharge event. Because the antistatic agent is located within the inner shell of the three-dimensional printed part it is not able to crack or rub off like post-process coatings and may provide a permanent protection against a static charge.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method of making a three-dimensional printed part comprising:
spreading a layer of build material;
selectively applying a fusing agent on the build material; and
selectively applying an antistatic agent, wherein the antistatic agent includes a water soluble compound.

2. The method of claim 1, wherein the fusing agent is selectively applied over the build material to form a core.

3. The method of claim 1, wherein the fusing agent and the antistatic agent are selectively applied over the build material to form an inner shell.

4. The method of claim 1, wherein the antistatic agent is selectively applied over the build material to form an external shell.

5. The method of claim 1, wherein 80% or greater radiation is transmitted by the antistatic agent in a near infrared wavelength.

6. A three-dimensional printed part comprising:
a core including a build material;
an inner shell including the build material and an antistatic agent, wherein the antistatic agent includes a water soluble compound; and
an external shell including the build material.

7. The three-dimensional printed part of claim 6, wherein the build material is selected from the group consisting of polyamides, polyethers, polyethylenes, polyethylene terephthalates, polystyrenes, polyacetals, polypropylenes, polycarbonates, polyesters, thermoplastic polyurethanes, and combinations thereof.

8. The three-dimensional printed part of claim 6, wherein the core further comprises a fusing agent.

9. The three-dimensional printed part of claim 6, wherein the inner shell further comprises a fusing agent.

10. The three-dimensional printed part of claim 6, wherein the external shell further comprises an antistatic agent that is the same or different from the antistatic agent of the inner shell.

11. The three-dimensional printed part of claim 6, wherein the antistatic agent is thermally stable at a polymer melt processing temperature.

12. The three-dimensional printed part of claim 6, wherein 20% or less radiation is absorbed in a near infrared wavelength by the antistatic agent.

13. The three-dimensional printed part of claim 6, wherein the antistatic agent includes a salt of an alkali or alkaline earth metal selected from the group consisting of quaternary amines, chlorates, phosphates, carbonates, borates, phosphonates, sulfates, acetates, citrates, and perchlorates.

14. The three-dimensional printed part of claim 6, wherein the antistatic agent includes a salt of lithium selected from the group consisting of $Li_2NiBr_4$, $Li_2CuCl_4$, $LiCuO$, $LiCu_4O(PO_4)_2$, $LiSOCl_2$, $LiSO_2Cl_2$, $LiSO_2$, $LiI_2$, $LiN_3$, $C_6H_5COOLi$, $LiBr$, $Li_2CO_3$, $LiCl$, $C_6H_{11}(CH_2)_3CO_2Li$, $LiBO_2$, $LiClO_4$, $Li_3PO_4$, $Li_2SO_4$, $Li_2B_4O_7$, $LiAlCl_4$, $AuCl_4Li$, $LiGaCl_4$, $LiBF_4$, $LiMnO_2$, $LiFeS_2$, $LiAg_2CrO_4$, $LiAg_2V_4O_{11}$, $LiSVO$, $LiCSVO$, $CF_3SO_3Li$, $LiPF_6$, $LiBF_4$, $LiClO_4$, $LiCuS$, $LiPbCuS$, $LiFeS$, $LiBi_2Pb_2O_5$, $LiBi_2O_3$, $LiV_2O_5$, $LiCoO_2$, $LiNiCoO_2$, $LiCuCl_2$, $Li/Al-V_2O_5$, lithium bis(oxalato)borate, $LiN(SO_2CF_3)_2$, $LiN(SOCF_2CF_3)2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, $LiOSO_2CF_3$, and combinations thereof.

15. A three-dimensional printed part comprising:
a core comprising a fusing agent;
an inner shell comprising a fusing agent, and an antistatic agent; and
an external shell comprising an antistatic agent,
wherein the antistatic agent of the inner shell or the external shell is present in a composition at an amount from about 0.01 wt. % to about 20 wt. % based upon a total weight percent of the composition.

* * * * *